United States Patent
Hsu et al.

(10) Patent No.: US 9,559,588 B2
(45) Date of Patent: Jan. 31, 2017

(54) POWER MANAGING APPARATUS, DC-DC CONTROL CIRCUIT, AND METHOD FOR ENABLING CHIP

(71) Applicant: uPI semiconductor corp., Zhubei, Hsinchu County (TW)

(72) Inventors: Cheng-Ching Hsu, Zhubei (TW); Yen-Hsun Wang, Zhubei (TW)

(73) Assignee: UPI SEMICONDUCTOR CORPORATION, Zhubei, Hsinchu County (TW)

( * ) Notice: Subject to any disclaimer, the term of this patent is extended or adjusted under 35 U.S.C. 154(b) by 119 days.

(21) Appl. No.: 14/662,293

(22) Filed: Mar. 19, 2015

(65) Prior Publication Data

US 2016/0056720 A1 Feb. 25, 2016

(30) Foreign Application Priority Data

Aug. 20, 2014 (TW) ............... 103128624 A

(51) Int. Cl.
| | | |
|---|---|---|
| G05F 1/00 | (2006.01) | |
| G05F 1/33 | (2006.01) | |
| H02M 3/158 | (2006.01) | |
| G06F 1/32 | (2006.01) | |
| H02M 1/00 | (2006.01) | |

(52) U.S. Cl.
CPC ............ *H02M 3/158* (2013.01); *G06F 1/3203* (2013.01); *H02M 2001/0032* (2013.01); *Y02B 70/16* (2013.01)

(58) Field of Classification Search
CPC ............ G05F 1/562; G05F 1/59; G05F 1/595; H02M 2001/0012; H02M 2001/0041

USPC .................. 323/241, 282, 283, 349, 351
See application file for complete search history.

(56) References Cited

U.S. PATENT DOCUMENTS

| | | | |
|---|---|---|---|
| 6,191,566 B1 | 2/2001 | Petricek et al. | |
| 8,022,726 B2 | 9/2011 | Candage et al. | |
| 8,294,487 B2* | 10/2012 | Hsieh ................ | H04B 1/16 326/31 |
| 2002/0084775 A1* | 7/2002 | Kim .................. | G05F 1/467 323/315 |
| 2004/0070434 A1* | 4/2004 | Okuno ............... | H02M 3/157 327/172 |
| 2005/0194951 A1* | 9/2005 | Mehas ............... | H02M 1/36 323/282 |
| 2008/0036521 A1* | 2/2008 | Kogishi ............. | G11O 5/063 327/333 |

(Continued)

*Primary Examiner* — Adolf Berhane
*Assistant Examiner* — Gary Nash
(74) *Attorney, Agent, or Firm* — McClure, Qualey & Rodack, LLP

(57) ABSTRACT

A power managing apparatus, a DC-DC control circuit, and a method for enabling a chip are disclosed. The power managing apparatus has an enable pin and the enable pin is used to couple a first level control circuit. The power managing apparatus includes a second level control circuit and a level detecting circuit. The second level control circuit is coupled to the enable pin. The level detecting circuit is coupled to the enable pin and used to detect a control signal on the enable pin. The control signal is transmitted from the first level control circuit. The control signal has at least three levels according to operations of the first level control circuit and the second level control circuit.

22 Claims, 6 Drawing Sheets

(56) References Cited

U.S. PATENT DOCUMENTS

| | | | |
|---|---|---|---|
| 2008/0136341 A1* | 6/2008 | Araki | H02M 3/33507 315/209 R |
| 2012/0139612 A1* | 6/2012 | Cyrusian | H03F 3/217 327/345 |
| 2013/0176008 A1* | 7/2013 | Li | H02M 1/36 323/273 |
| 2013/0207625 A1* | 8/2013 | Futamura | G05F 1/10 323/271 |

* cited by examiner

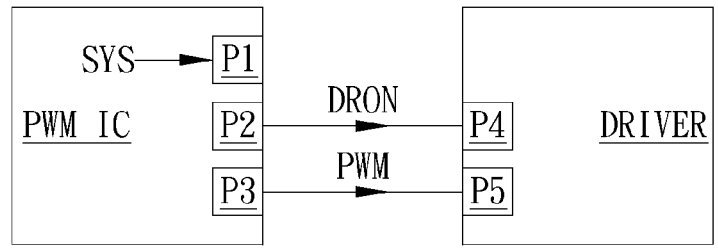
FIG. 1 (PRIOR ART)
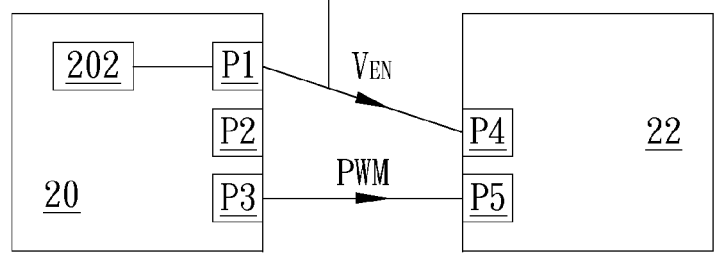
FIG. 2
| $V_{EN}$ | Power Controller 20 | Driver 22 |
|---|---|---|
| L3 | Enable | Enable |
| L2 | | Disable |
| L1 | Disable | |
FIG. 3

POWER MANAGING APPARATUS, DC-DC CONTROL CIRCUIT, AND METHOD FOR ENABLING CHIP

BACKGROUND OF THE INVENTION

1. Field of the Invention

The invention relates to a power managing apparatus; in particular, to a power managing apparatus, a DC-DC control circuit, and a method for enabling a chip capable of saving additional enable pins to enhance function expandability.

2. Description of the Prior Art

Please refer to FIG. 1. FIG. 1 illustrates a schematic diagram of the pulse width modulation integrated circuit (PWM IC) and the driver coupled in the power converter and the signal transmissions between them in the prior art.

As shown in FIG. 1, the pulse width modulation integrated circuit PWM IC of the power converter 1 has pins P1~P3, wherein the pin P1 is an enable pin used for receiving an input signal SYS from the system to control the pulse width modulation integrated circuit PWM IC itself operated in an enable state or a disable state; the pin P2 is a control pin coupled to the driver DRIVER and used for transmitting an enable control signal DRON to the driver DRIVER to control the driver DRIVER operated in the enable state or the disable state; the pin P3 is used for outputting a pulse width modulation signal PWM to the driver DRIVER when the pulse width modulation integrated circuit PWM IC is operated in the enable state.

The driver DRIVER of the power converter 1 has pins P4~P5 wherein the pin P4 is an enable pin coupled to the control pin P2 of the used for the pulse width modulation integrated circuit PWM IC and used for receiving the enable control signal DRON provided by the control pin P2 to control the driver DRIVER itself operated in the enable state or the disable state; the pin P5 is an input pin coupled to the pin P3 of the pulse width modulation integrated circuit PWM IC and used for receiving the pulse width modulation signal PWM when the driver DRIVER is operated in the enable state.

It should be noted that when the enable control signal DRON provided by the control pin P2 of the pulse width modulation integrated circuit PWM IC is high-level, the driver DRIVER will be operated in the enable state; when the enable control signal DRON provided by the control pin P2 of the pulse width modulation integrated circuit PWM IC is low-level, the driver DRIVER will be operated in the disable state.

However, since the pulse width modulation integrated circuit PWM IC in the power converter has limited number of pins, if one pin (e.g., the control pin P2) of the pulse width modulation integrated circuit PWM IC is specifically used to control the driver DRIVER operated in the enable state or the disable state, there will be one less pin to be set for other functions and the function expandability of the pulse width modulation integrated circuit PWM IC will be severely limited.

SUMMARY OF THE INVENTION

Therefore, the invention provides a power managing apparatus, a DC-DC control circuit, and a method for enabling a chip to solve the above-mentioned problems occurred in the prior arts.

An embodiment of the invention is a power managing apparatus. In this embodiment, the power managing apparatus has an enable pin and the enable pin is used to couple a first level control circuit. The power managing apparatus includes a second level control circuit and a level detecting circuit. The second level control circuit is coupled to the enable pin. The level detecting circuit is coupled to the enable pin and used to detect a control signal on the enable pin. The control signal is transmitted from the first level control circuit. The control signal has at least three levels according to operations of the first level control circuit and the second level control circuit.

In an embodiment, when the level detecting circuit detects that the control signal is at a first level, the level detecting circuit controls the power managing apparatus operated in a disable state.

In an embodiment, when the level detecting circuit detects that the control signal is at a second level or a third level, the level detecting circuit controls the power managing apparatus operated in an enable state.

In an embodiment, when the level detecting circuit detects that the control signal is at a first level or a second level, the level detecting circuit controls the power managing apparatus operated in a disable state.

In an embodiment, when the level detecting circuit detects that the control signal is at a third level, the level detecting circuit controls the power managing apparatus operated in an enable state.

In an embodiment, the first level control circuit includes a first resistance unit and a first control switch, one terminal of the first resistance unit is coupled to a first operating voltage and the other terminal of the first resistance unit is coupled to the first control switch, the first control switch receives a system control signal and operates according to the system control signal.

In an embodiment, the second level control circuit includes a second resistance unit and a second control switch, one terminal of the second resistance unit is coupled to the enable pin and the level detecting circuit, the other terminal of the second resistance unit is coupled to the second control switch.

In an embodiment, the second level control circuit includes a current source coupled to the enable pin and the level detecting circuit.

In an embodiment, the first level control circuit includes a first resistance unit and a first control switch, the second level control circuit includes a second resistance unit and a second control switch, the first control switch and the second control switch are controlled to make the first resistance unit and the second resistance unit to form a voltage divider network.

Another embodiment of the invention is a DC-DC control circuit. In this embodiment, the DC-DC control circuit includes a first level control circuit, a power controller, and a driver. The first level control circuit is used for providing a control signal. The power controller has a first enable pin and includes a second level control circuit, wherein the power controller is coupled to the first level control circuit through the first enable pin. The driver has a second enable pin coupled to the first level control circuit and the first enable pin. The control signal has at least three levels according to the operations of the first level control circuit and the second level control circuit, and the power controller and the driver are enabled or disabled according to the at least three levels of the control signal.

Another embodiment of the invention is a method for enabling a chip. In this embodiment, the method is applied to a DC-DC control circuit. The DC-DC control circuit includes a first level control circuit, a power controller, and a driver. The power controller has a first enable pin and includes a second level control circuit. The first enable pin is coupled to the first level control circuit. The driver has a second enable pin coupled to the first level control circuit and the first enable pin. The method includes steps of: controlling operations of the first level control circuit and the second level control circuit to make the first level control circuit to provide a control signal having at least three levels; and enabling or disabling the power controller and the driver according to the at least three levels of the control signal.

Compared to the prior arts, in the power managing apparatus, the DC-DC control circuit, and the method for enabling a chip of the invention, the power controller uses its input pin, which is originally used to receive control signal from system, to control the power controller and the driver operated in the enable state or disable state in a multi-stage enabling way without wasting one independent pin to specifically control the driver operated in the enable state or disable state; therefore, the power controller can save one pin to be set for other functions, the function expandability of the entire system can be effectively enhanced.

The advantage and spirit of the invention may be understood by the following detailed descriptions together with the appended drawings.

BRIEF DESCRIPTION OF THE APPENDED DRAWINGS

FIG. 1 illustrates a schematic diagram of the pulse width modulation integrated circuit (PWM IC) and the driver coupled in the power converter and the signal transmissions between them in the prior art.

FIG. 2 illustrates a schematic diagram of the power managing apparatus in an embodiment of the invention.

FIG. 3 illustrates the corresponding relationships between the three levels L1~L3 of the control signal $V_{EN}$ and the enable state or disable state of the power controller 20 and driver 22.

DETAILED DESCRIPTION OF THE INVENTION

Figure 4:
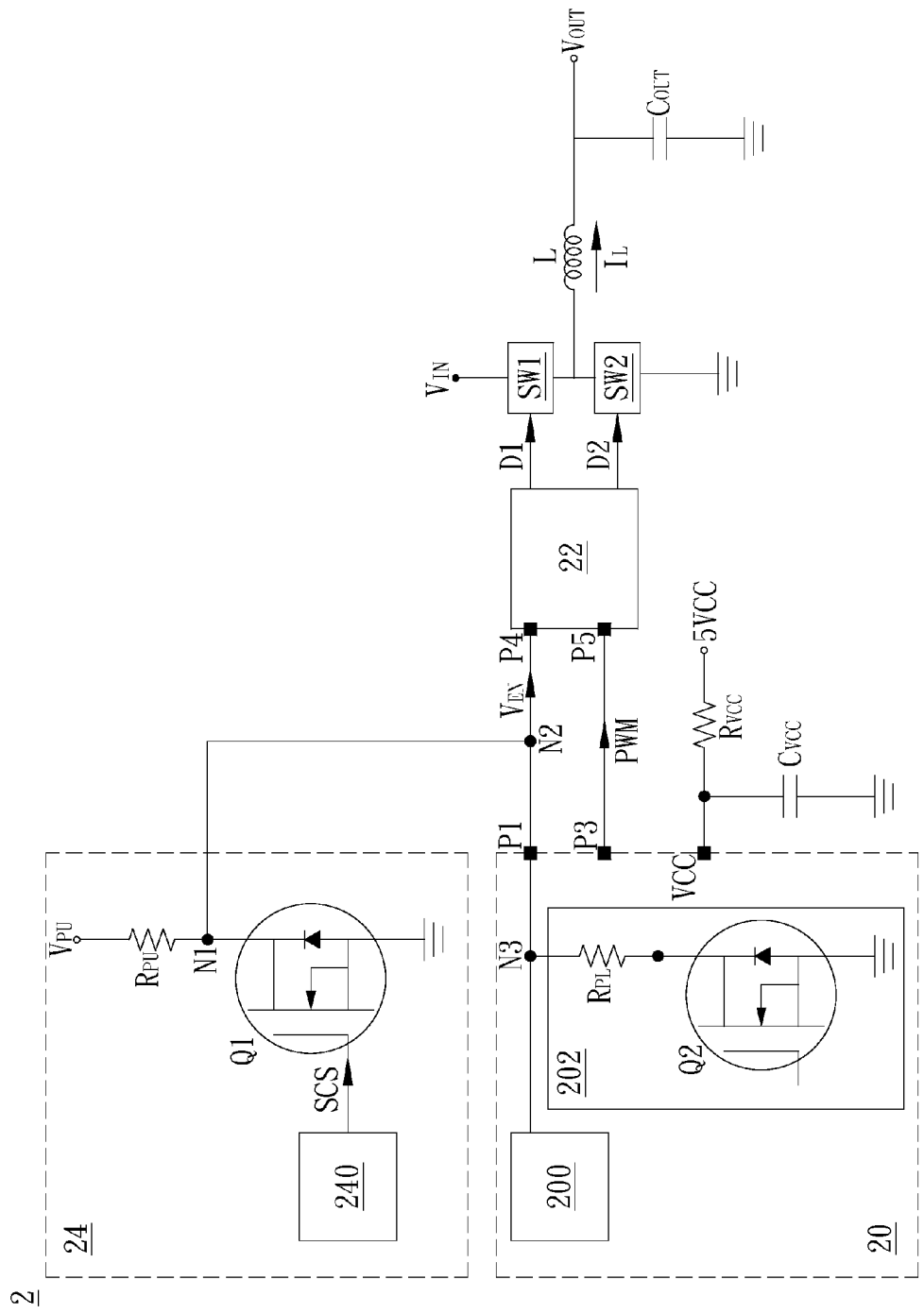
FIG. 4 illustrates a circuit schematic diagram of the DC-DC control circuit in another embodiment of the invention.

Exemplary embodiments of the present invention are referenced in detail now, and examples of the exemplary embodiments are illustrated in the drawings. Further, the same or similar reference numerals of the elements/components in the drawings and the detailed description of the invention are used on behalf of the same or similar parts.

In the following embodiments, the term "coupled" can be various types of directly coupled, indirectly coupled, or electrically connected without limiting their connection relationship. The term "circuit" represents at least one element or elements which are actively and/or passively coupled to provide appropriate functions. The term "signal" represents at least one current, voltage, load, temperature, data, or other signals. The term "resistance unit" represents at least one resistor or a resistor network including at least one resistor and other components. The term "level" represents the current value or voltage value of at least one signal.

A preferred embodiment of the invention is a power managing apparatus. In this embodiment, the power managing apparatus of the invention can be any power conversion related analog IC, such as the PWM controller, the driver, the DC-DC controller, the DC-DC converter, or the low dropout regulator (LDO), without specific limitations.

Please refer to FIG. 2. FIG. 2 illustrates a schematic diagram of the power managing apparatus in this embodiment. In this embodiment, the power managing apparatus is a power controller in a DC-DC control circuit. As shown in FIG. 2, the DC-DC control circuit 2 includes a power controller 20, a driver 22, and a first level control circuit 24. The power controller 20 has pins P1~P3 and the driver 22 has pins P4~P5, wherein the pin P1 of the power controller 20 is a first enable pin coupled to the first level control circuit 24 and the pin P4 of the driver 22; the pin P4 of the driver 22 is a second enable pin coupled to the first level control circuit 24 and the pin P1 of the power controller 20.

The power controller 20 further includes a second level control circuit 202 coupled to the pin P1. The first level control circuit 24 is used to provide a control signal $V_{EN}$, and the control signal $V_{EN}$ has at least three levels according to the operations of the first level control circuit 24 and the second level control circuit 202. For example, it is assumed that the control signal $V_{EN}$ can have a first level, a second level, and a third level, wherein the second level is higher than the first level and the third level is higher than the second level. When the control signal $V_{EN}$ is at the first level, the power controller 20 and the driver 22 are both disabled and operated in the disable state according to the first level of the control signal $V_{EN}$; when the control signal $V_{EN}$ is at the second level higher than the first level, the power controller 20 is enabled and operated in the enable state according to the second level of the control signal $V_{EN}$, but the driver 22 is still disabled and operated in the disable state according to the second level of the control signal $V_{EN}$; when the control signal $V_{EN}$ is at the third level higher than the second level, the power controller 20 and the driver 22 are both enabled and operated in the enable state according to the third level of the control signal $V_{EN}$. That is to say, the lowest level of the control signal $V_{EN}$ needed to enable the power controller 20 is different from the lowest level of the control signal $V_{EN}$ needed to enable the driver 22. In this embodiment, the lowest level of the control signal $V_{EN}$ needed to enable the power controller 20 is the second level, and the lowest level of the control signal $V_{EN}$ needed to enable the driver 22 is the third level higher than the second level, but not limited to this case. Another pin P3 of the power controller 20 can be coupled to the pin P5 of the driver 22 and used to output a pulse width modulation signal PWM to the driver 22.

It should be noticed that when the power controller 20 is disabled and operated in the disable state, most components in the power controller 20 are shut down or all components in the power controller 20 are shut down to reduce power consumption; when the power controller 20 is enabled and operated in the enable state, all components in the power controller 20 are normally operated. Similarly, when the driver 22 is disabled and operated in the disable state, most components in the driver 22 are shut down or all components in the driver 22 are shut down to reduce power consumption;

when the driver 22 is enabled and operated in the enable state, all components in the driver 22 are normally operated.

Please refer to FIG. 3. The control signal $V_{EN}$ provided by the first level control circuit 24 in FIG. 3 has a first level L1, a second level L2, and a third level L3. It should be noticed that the control signal $V_{EN}$ of the invention can have at least three levels based on practical needs, but not limited to this case.

As shown in FIG. 3, in an embodiment of the invention, the first level L1 is lower than the second level L2 and the second level L2 is lower than the third level L3. For the power controller 20, when the control signal $V_{EN}$ is at the first level L1, the power controller 20 is disabled and operated in the disable state; when the control signal $V_{EN}$ is at the second level L2, the power controller 20 is enabled and operated in the enable state; when the control signal $V_{EN}$ is at the third level L3, the power controller 20 is enabled and operated in the enable state. For the driver 22, when the control signal $V_{EN}$ is at the first level L1, the driver 22 is disabled and operated in the disable state; when the control signal $V_{EN}$ is at the second level L2, the driver 22 is disabled and operated in the disable state; when the control signal $V_{EN}$ is at the third level L3, the driver 22 is enabled and operated in the enable state.

That is to say, when the control signal $V_{EN}$ is at the first level L1, the power controller 20 and the driver 22 are both disabled and operated in the disable state; when the control signal $V_{EN}$ is at the second level L2, the power controller 20 is enabled and operated in the enable state, but the driver 22 is still disabled and operated in the disable state; when the control signal $V_{EN}$ is at the third level L3, the power controller 20 and the driver 22 are both enabled and operated in the enable state. Therefore, when the level of the control signal $V_{EN}$ provided by the first level control circuit 24 changes, the power controller 20 and the driver 22 will also change their enable state or disable state accordingly.

Then, please refer to FIG. 4. FIG. 4 illustrates a circuit schematic diagram of the DC-DC control circuit 2 in another embodiment of the invention. As shown in FIG. 4, the first level control circuit 24 includes a system power source sequence control unit 240, a pull-resistance unit $R_{PU}$, and a control switch $Q_1$. The pull-resistance unit $R_{PU}$ and the control switch $Q_1$ are coupled in series between an operating voltage $V_{PU}$ and a ground terminal; the system power source sequence control unit 240 is coupled to the control switch $Q_1$; a node N1 located between the pull-resistance unit $R_{PU}$ and the control switch $Q_1$ is coupled to a node N2 located between the pin P1 of the power controller 20 and the pin P4 of the driver 22. The power controller 20 includes a level detection circuit 200 and a second level control circuit 202. The second level control circuit 202 includes a resistance unit $R_{PL}$ and an internal control switch $Q_2$. The level detection circuit 200 is coupled to the pin P1; the resistance unit $R_{PL}$ and the internal control switch $Q_2$ are coupled in series between the node N3 and the ground terminal; the node N3 is located between the level detection circuit 200 and the pin P1.

The first level control circuit 24 can be an enable timing circuit of the system used to control the power controller 20. The first level control circuit 24 can control the multi-stage change of the control signal $V_{EN}$ by using the operating voltage $V_{PU}$, the timing of switching to the pull-resistance unit $R_{PU}$ and the control switch $Q_1$ or the resistance unit $R_{PL}$ and the internal control switch $Q_2$ in the second level control circuit 202, and the level detection circuit 200 used to detect the voltage level of the control signal $V_{EN}$, and further control the multi-stage enabling of the power controller 20 and the driver 22. VCC represents the power of the power controller 20.

In this embodiment, the power controller 20 and the driver 22 can be controlled in different operation states according to FIG. 3 and the ON state or the OFF state of the control switches $Q_1$ and $Q_2$ in FIG. 4. Please refer to Table 1.

TABLE 1

| $Q_1$ | $Q_2$ | $V_{EN}$ (Volt) | Voltage Level of $V_{EN}$ | Operation State of Power Controller 20 | Operation State of Driver 22 |
|---|---|---|---|---|---|
| ON | ON | 0 | First Level L1 | Disable | Disable |
| ON | OFF | 0 | First Level L1 | Disable | Disable |
| OFF | ON | $V_{PU} \times R_{PL}/(R_{PU} + R_{PL})$ | Second Level L2 | Enable | Disable |
| OFF | OFF | $V_{PU}$ | Third Level L3 | Enable | Enable |

As shown in Table 1, when the control switches $Q_1$ and $Q_2$ in FIG. 4 are both operated in the ON state, the voltage level of the control signal $V_{EN}$ detected by the level detection circuit 200 is 0 volt, that is to say, the control signal $V_{EN}$ is at the first level L1 at this time, and the power controller 20 and the driver 22 will be disabled and operated in the disable state. At this time, the power controller 20 may fail to output the pulse width modulation signal PWM to the driver 22, so that the driver 22 may fail to output the switch driving signals D1 and D2 respectively according to the pulse width modulation signal PWM to control the operations of two transistors SW1~SW2 of the output stage. In fact, the two transistors SW1~SW2 of the output stage could be MOSFETs, but not limited to this case.

When the control switches $Q_1$ and $Q_2$ in FIG. 4 are both operated in the OFF state, the voltage level of the control signal $V_{EN}$ detected by the level detection circuit 200 is $V_{PU}$ volts, that is to say, the control signal $V_{EN}$ is at the third level L3 at this time, and the power controller 20 and the driver 22 will be enabled and operated in the enable state. At this time, the power controller 20 can output the pulse width modulation signal PWM to the driver 22, so that the driver 22 can output the switch driving signals D1 and D2 respectively according to the pulse width modulation signal PWM to control the operations of two transistors SW1~SW2 of the output stage.

When the control switch $Q_1$ in FIG. 4 is operated in the ON state and the control switch $Q_2$ in FIG. 4 is operated in the OFF state, the voltage level of the control signal $V_{EN}$ detected by the level detection circuit 200 is close to 0 volt, that is to say, the control signal $V_{EN}$ is at the first level L1 at this time, and the power controller 20 and the driver 22 will be disabled and operated in the disable state. At this time, the power controller 20 may fail to output the pulse width modulation signal PWM to the driver 22, so that the driver 22 may fail to output the switch driving signals D1 and D2 respectively according to the pulse width modulation signal PWM to control the operations of two transistors SW1~SW2 of the output stage.

When the control switch $Q_1$ in FIG. 4 is operated in the OFF state and the control switch $Q_2$ in FIG. 4 is operated in the ON state, the voltage level of the control signal $V_{EN}$ detected by the level detection circuit 200 is $V_{PU} \times R_{PL}/(R_{PU}+R_{PL})$ volts which belongs to the second level L2, that is to say, the control signal $V_{EN}$ is at the second level L2 at this time, and the power controller 20 will be enabled and operated in the enable state but the driver 22 will be disabled and operated in the disable state. It should be noticed that when the control switch $Q_1$ in FIG. 4 is operated in the OFF state and the control switch $Q_2$ in FIG. 4 is operated in the ON state, the power controller 20 will be normally operated but the operation of the driver 22 will be stopped; therefore, the operation states of the power controller 20 and the driver 22 will be unequal.

Figure 5:
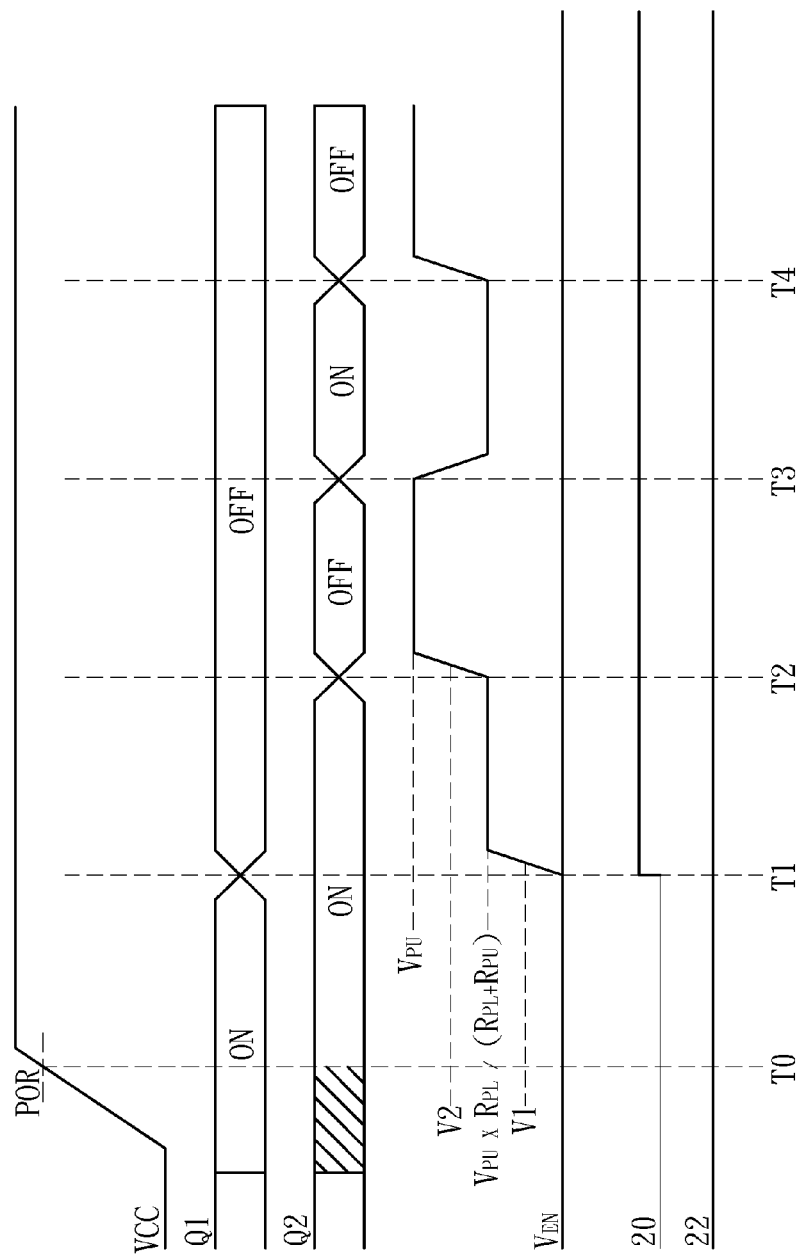
FIG. 5 illustrates a timing diagram of the operation states of the DC-DC control circuit in FIG. 4.

Please refer to FIG. 4, FIG. 5, and Table 1. FIG. 5 illustrates a timing diagram of the operation states of the DC-DC control circuit 2 in FIG. 4. As shown in FIG. 5, VCC represents the power of the power controller 20 and POR represents the lowest voltage level that the power controller 20 can start to work.

Before the voltage level of the power VCC of the power controller 20 reaches the lowest voltage level POR, namely before the time T0, the control switch $Q_1$ in FIG. 4 will be operated in the ON state and the voltage level of the control signal $V_{EN}$ detected by the level detection circuit 200 is 0 volt; at this time, the power controller 20 and the driver 22 will be both disabled and operated in the disable state.

At the time T0, the voltage level of the power VCC of the power controller 20 starts to be higher than the lowest voltage level POR, the control switch $Q_1$ in FIG. 4 will be maintained in the ON state and the control switch $Q_2$ in FIG. 4 will start to be operated in the ON state, and the voltage level of the control signal $V_{EN}$ detected by the level detection circuit 200 is 0 volt; at this time, the power controller 20 and the driver 22 will be both disabled and operated in the disable state.

At the time T1, the system power source sequence control unit 240 in the first level control circuit 24 will output a system control signal SCS to control the control switch $Q_1$ switched from the ON state to the OFF state, and the voltage level of the control signal $V_{EN}$ detected by the level detection circuit 200 will be changed from 0 volt to $V_{PU} \times R_{PL}/(R_{PU}+R_{PL})$ volts which belongs to the second level L2; at this time, the power controller 20 is enabled from the disable state, but the driver 22 is still operated in the disable state. Because the power controller 20 is operated in the enable state, the power controller 20 can start to do some pre-jobs before outputting the pulse width modulation signal PWM, such as procedures of self-calibration and function setting, and wait the driver 22 to be enabled.

At the time T2, the system power source sequence control unit 240 in the first level control circuit 24 will output the system control signal SCS to control the control switch $Q_2$ switched from the ON state to the OFF state, and the voltage level of the control signal $V_{EN}$ detected by the level detection circuit 200 will be changed from $V_{PU} \times R_{PL}/(R_{PU}+R_{PL})$ volts to $V_{PU}$ volts which belongs to the third level L3; at this time, the driver 22 is enabled from the disable state, and the power controller 20 operated in the enable state will start to output the pulse width modulation signal PWM to the driver 22, and the driver 22 can also output the switch driving signals D1 and D2 respectively according to the pulse width modulation signal PWM to control the operations of two transistors SW1~SW2 of the output stage.

At the time T3, if the power controller 20 receives a command signal from the CPU or other sources and enters into a standby power saving mode, the control switch $Q_2$ will be switched from the OFF state to the ON state, and the voltage level of the control signal $V_{EN}$ detected by the level detection circuit 200 will be changed from $V_{PU}$ volts to $V_{PU} \times R_{PL}/(R_{PU}+R_{PL})$ volts which belongs to the second level L2. At this time, the driver 22 will be changed from the enable state to the disable state, but the power controller 20 will be still operated in the enable state; therefore, the power controller 20 can start to do some pre-jobs before outputting the pulse width modulation signal PWM, such as procedures of self-calibration and function setting, and wait the driver 22 to be enabled again.

At the time T4, if the power controller 20 receives the command signal from the CPU or other sources and enters into a normal operating mode, the control switch $Q_2$ will be switched from the ON state to the OFF state again, and the voltage level of the control signal $V_{EN}$ detected by the level detection circuit 200 will be changed from $V_{PU} \times R_{PL}/(R_{PU}+R_{PL})$ volts to $V_{PU}$ volts which belongs to the third level L3. At this time, the driver 22 will be enabled from the disable state again, and the power controller 20 operated in the enable state will start to output the pulse width modulation signal PWM to the driver 22 again, and the driver 22 can also output the switch driving signals D1 and D2 respectively according to the pulse width modulation signal PWM to control the operations of two transistors SW1~SW2 of the output stage.

Figure 6:
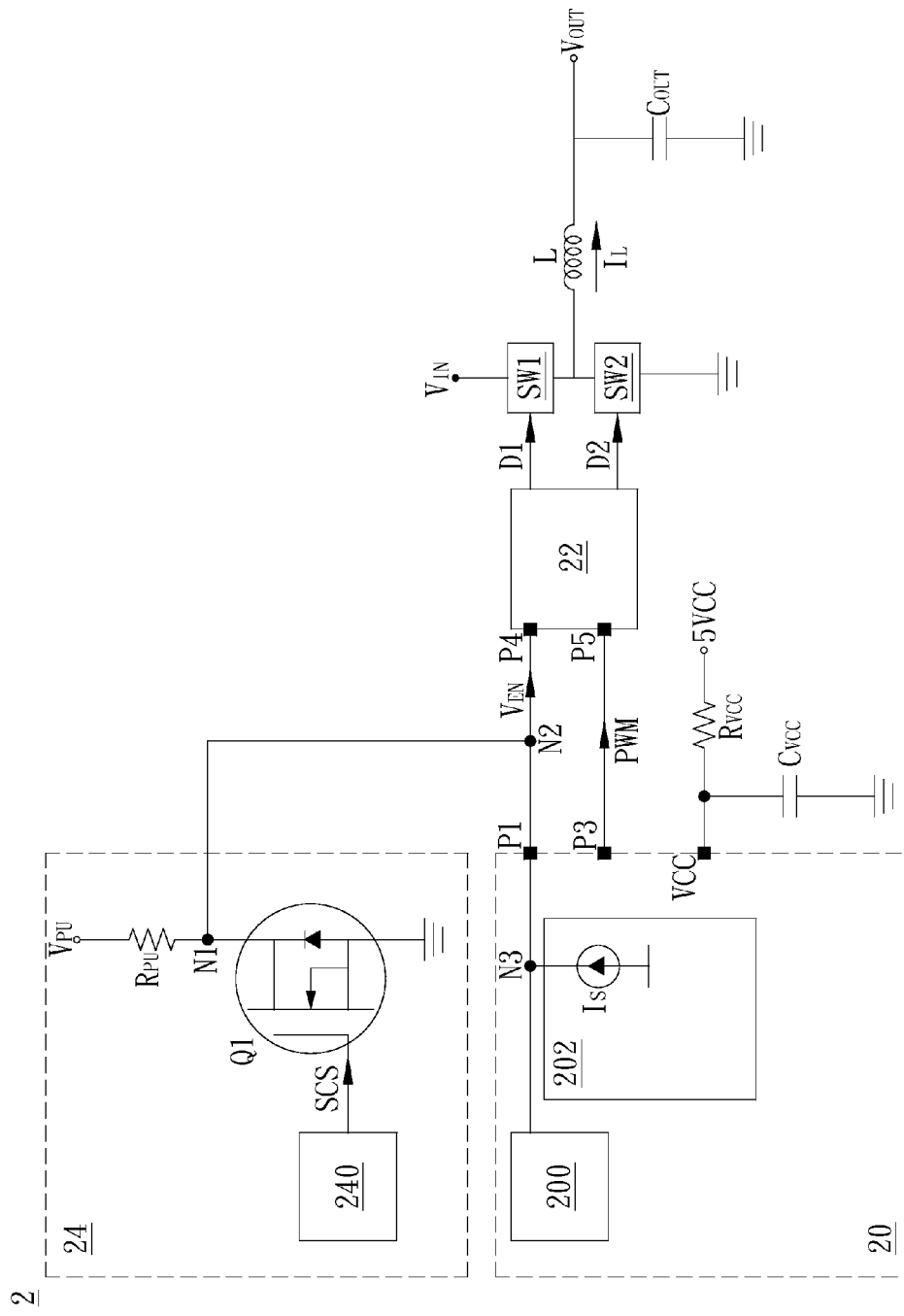
FIG. 6 illustrates a circuit schematic diagram of the DC-DC control circuit in another embodiment of the invention.

Please refer to FIG. 6. FIG. 6 illustrates a circuit schematic diagram of the DC-DC control circuit in another embodiment of the invention. As shown in FIG. 6, the first level control circuit 24 includes a system power source sequence control unit 240, a pull-resistance unit $R_{PU}$, and a control switch $Q_1$. The pull-resistance unit $R_{PU}$ and the control switch $Q_1$ are coupled in series between an operating voltage $V_{PU}$ and a ground terminal; the system power source sequence control unit 240 is coupled to the control switch $Q_1$; a node N1 located between the pull-resistance unit $R_{PU}$ and the control switch $Q_1$ is coupled to a node N2 located between the pin P1 of the power controller 20 and the pin P4 of the driver 22. The power controller 20 includes a level detection circuit 200 and a second level control circuit 202. The second level control circuit 202 includes a current source $I_s$. The level detection circuit 200 is coupled to the pin P1; the current source $I_s$ is coupled in series between the node N3 and the ground terminal; the node N3 is located between the level detection circuit 200 and the pin P1.

The first level control circuit 24 can be used to control the power controller 20. The first level control circuit 24 can control the multi-stage change of the control signal $V_{EN}$ by using the operating voltage $V_{PU}$, the timing of switching to the pull-resistance unit $R_{PU}$ and the control switch $Q_1$ or the current source $I_s$ in the second level control circuit 202, and the level detection circuit 200 used to detect the voltage level of the control signal $V_{EN}$, and further control the multi-stage enabling of the power controller 20 and the driver 22. VCC represents the power of the power controller 20.

In this embodiment, the power controller 20 and the driver 22 can be controlled in different operation states according to FIG. 3 and the ON state or the OFF state of the control switch $Q_1$ and the current source $I_s$ in FIG. 6. Please refer to Table 2.

TABLE 2

| $Q_1$ | $I_s$ | $V_{EN}$ (Volt) | Voltage Level of $V_{EN}$ | Operation State of Power Controller 20 | Operation State of Driver 22 |
|---|---|---|---|---|---|
| ON | OFF | 0 | First Level L1 | Disable | Disable |
| ON | ON | 0 | First Level L1 | Disable | Disable |
| OFF | OFF | $V_{PU}$ | Second Level L2 | Enable | Disable |
| OFF | ON | $V_{PU}$ + ($I_S \times R_{PU}$) | Third Level L3 | Enable | Enable |

As shown in Table 2, when the control switch $Q_1$ and the current source $I_s$ in FIG. 6 are both operated in the ON state, the voltage level of the control signal $V_{EN}$ detected by the level detection circuit 200 is 0 volt, that is to say, the control signal $V_{EN}$ is at the first level L1 at this time, and the power controller 20 and the driver 22 will be disabled and operated in the disable state.

When the control switch $Q_1$ in FIG. 6 is operated in the ON state and the current source $I_s$ in FIG. 6 is operated in the OFF state, the voltage level of the control signal $V_{EN}$ detected by the level detection circuit 200 is 0 volt, that is to say, the control signal $V_{EN}$ is at the first level L1 at this time, and the power controller 20 and the driver 22 will be disabled and operated in the disable state.

When the control switch $Q_1$ and the current source $I_s$ in FIG. 6 are both operated in the OFF state, the voltage level of the control signal $V_{EN}$ detected by the level detection circuit 200 is $V_{PU}$ volts, that is to say, the control signal $V_{EN}$ is at the second level L2 at this time, and the power controller 20 will be enabled and operated in the enable state, but the driver 22 will be disabled and operated in the disable state. Therefore, the operation states of the power controller 20 and the driver 22 will be unequal.

When the control switch $Q_1$ in FIG. 6 is operated in the OFF state and the current source $I_s$ in FIG. 6 is operated in the ON state, the voltage level of the control signal $V_{EN}$ detected by the level detection circuit 200 is $V_{PU}+(I_s \times R_{PU})$ volts, that is to say, the control signal $V_{EN}$ is at the third level L3 at this time, and the power controller 20 and the driver 22 will be enabled and operated in the enable state.

Figure 7:
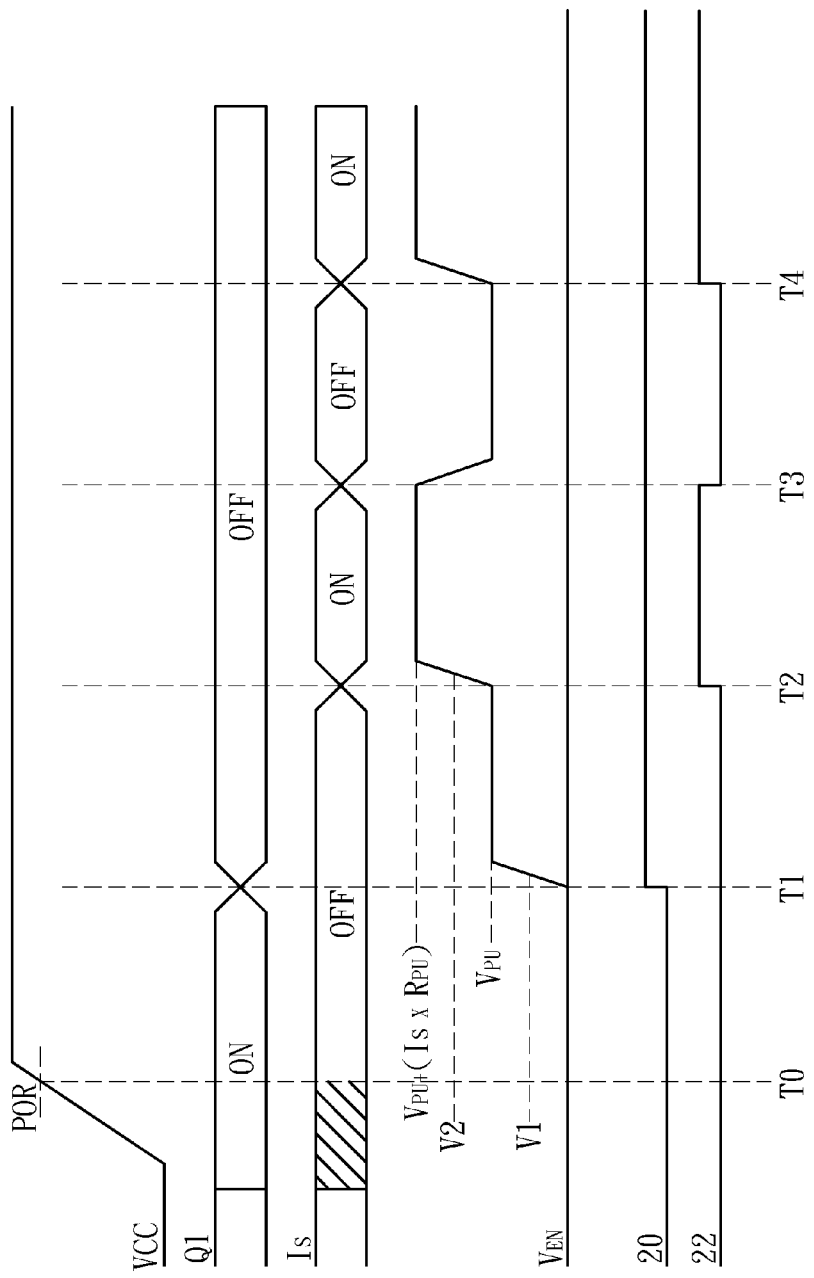
FIG. 7 illustrates a timing diagram of the operation states of the DC-DC control circuit in FIG. 6.

Please refer to FIG. 6, FIG. 7, and Table 2. FIG. 7 illustrates a timing diagram of the operation states of the DC-DC control circuit 2 in FIG. 6. As shown in FIG. 7, VCC represents the power of the power controller 20 and POR represents the lowest voltage level that the power controller 20 can start to work.

Before the voltage level of the power VCC of the power controller 20 reaches the lowest voltage level POR, namely before the time T0, the control switch $Q_1$ in FIG. 6 will be operated in the ON state and the voltage level of the control signal $V_{EN}$ detected by the level detection circuit 200 is 0 volt; at this time, the power controller 20 and the driver 22 will be both disabled and operated in the disable state.

At the time T0, the voltage level of the power VCC of the power controller 20 starts to be higher than the lowest voltage level POR, the control switch $Q_1$ in FIG. 4 will be maintained in the ON state and the current source $I_s$ in FIG. 6 will be operated in the OFF state, and the voltage level of the control signal $V_{EN}$ detected by the level detection circuit 200 is 0 volt; at this time, the power controller 20 and the driver 22 will be both disabled and operated in the disable state.

At the time T1, the system power source sequence control unit 240 in the first level control circuit 24 will output a system control signal SCS to control the control switch $Q_1$ switched from the ON state to the OFF state, but the current source $I_s$ is still operated in the OFF state; the voltage level of the control signal $V_{EN}$ detected by the level detection circuit 200 will be changed from 0 volt to $V_{PU}$ volts which belongs to the second level L2; at this time, the power controller 20 is enabled from the disable state, but the driver 22 is still operated in the disable state. Because the power controller 20 is operated in the enable state, the power controller 20 can start to do some pre-jobs before outputting the pulse width modulation signal PWM, such as procedures of self-calibration and function setting, and wait the driver 22 to be enabled.

At the time T2, the system power source sequence control unit 240 in the first level control circuit 24 will output the system control signal SCS to control the current source $I_s$ switched from the OFF state to the ON state, and the voltage level of the control signal $V_{EN}$ detected by the level detection circuit 200 will be changed from $V_{PU}$ volts to $V_{PU}+(I_s \times R_{PU})$ volts which belongs to the third level L3; at this time, the driver 22 is enabled from the disable state, and the power controller 20 operated in the enable state will start to output the pulse width modulation signal PWM to the driver 22, and the power controller 20 and the driver 22 will be normally operated in the enable state at the same time.

At the time T3, if the power controller 20 receives a command signal from the CPU or other sources and enters into a standby power saving mode, the current source $I_s$ will be switched from the ON state to the OFF state, and the voltage level of the control signal $V_{EN}$ detected by the level detection circuit 200 will be changed from $V_{PU}+(I_s \times R_{PU})$ volts to $V_{PU}$ volts which belongs to the second level L2. At this time, the driver 22 is changed from the enable state to the disable state, but the power controller 20 is still operated in the enable state.

At the time T4, if the power controller 20 receives the command signal from the CPU or other sources and enters into a normal operating mode, the current source $I_s$ will be switched from the OFF state to the ON state again, and the voltage level of the control signal $V_{EN}$ detected by the level detection circuit 200 will be changed from $V_{PU}$ volts to $V_{PU}+(I_s \times R_{PU})$ volts which belongs to the third level L3. At this time, the driver 22 will be enabled from the disable state again, and the power controller 20 operated in the enable state will start to output the pulse width modulation signal PWM to the driver 22 again, and the power controller 20 and the driver 22 will be normally operated in the enable state at the same time.

Another embodiment of the invention is a method for enabling a chip. In this embodiment, the method is applied to a DC-DC control circuit, but not limited to this case. In practical applications, the DC-DC control circuit can include a first level control circuit, a power controller, and a driver. The power controller has a first enable pin and includes a second level control circuit. The first enable pin is coupled to the first level control circuit. The driver has a second enable pin coupled to the first level control circuit and the first enable pin.

Figure 8:
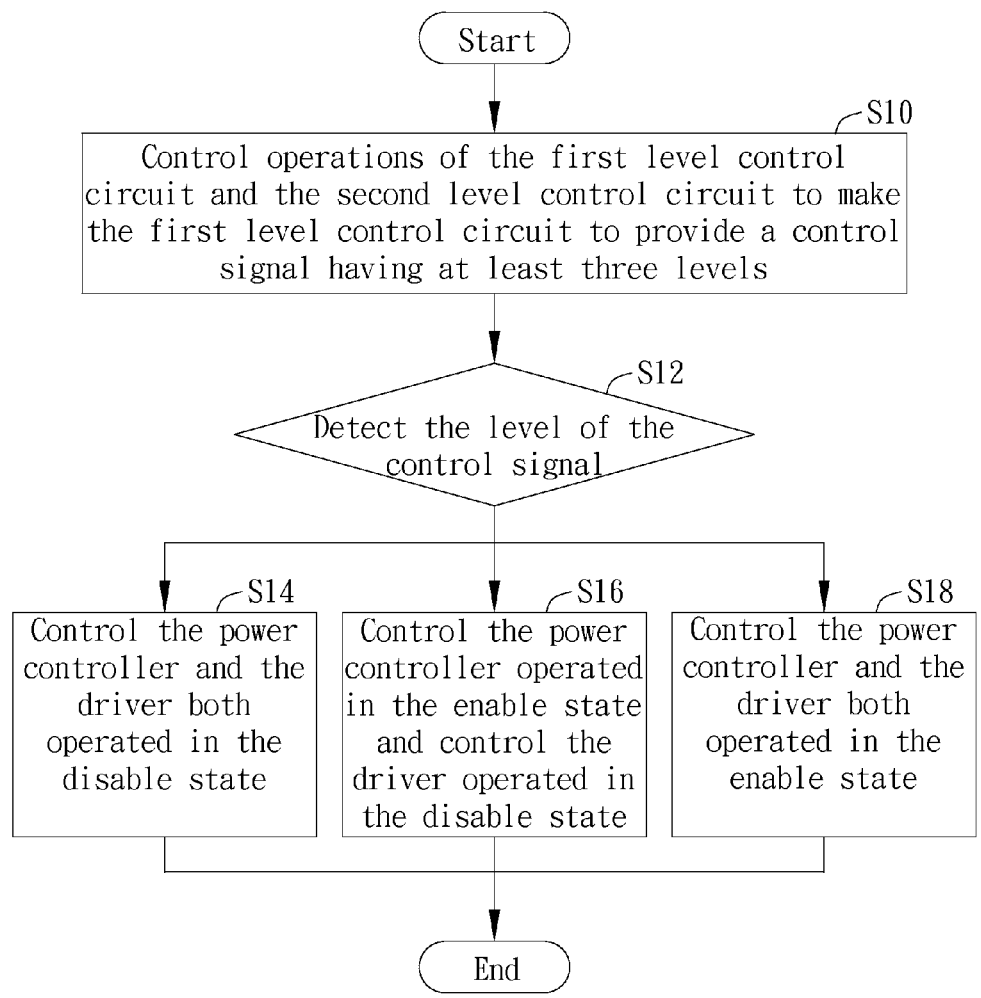
FIG. 8 illustrates a flowchart of the method for enabling a chip applied to the DC-DC control circuit in another embodiment of the invention.

Please refer to FIG. 8. FIG. 8 illustrates a flowchart of the method for enabling a chip in this embodiment. As shown in FIG. 8, in the step S10, the method controls operations of the first level control circuit and the second level control circuit to make the first level control circuit to provide a control signal having at least three levels. In fact, the control signal provided by the first level control circuit at least has a first level, a second level, and a third level, wherein the first level is lower than the second level and the second level is lower than the third level.

In the step S12, the method detects the level of the control signal. If the detection result of the step S12 is that the control signal is at the first level, the method will perform the step S14 to control the power controller and the driver both operated in the disable state.

If the detection result of the step S12 is that the control signal is at the second level, the method will perform the step S16 to control the power controller operated in the enable state and control the driver operated in the disable state.

If the detection result of the step S12 is that the control signal is at the third level, the method will perform the step S18 to control the power controller and the driver both operated in the enable state.

As to the detailed circuit structure and operation of the power controller, please refer to the text, tables and drawings of the above-mentioned embodiments, this is not separately repeat here.

Compared to the prior arts, in the power managing apparatus, the DC-DC control circuit, and the method for enabling a chip of the invention, the power controller uses its input pin, which is originally used to receive control signal from system, to control the power controller and the driver operated in the enable state or disable state in a multi-stage enabling way without wasting one independent pin to specifically control the driver operated in the enable state or disable state; therefore, the power controller can save one pin to be set for other functions, the function expandability of the entire system can be effectively enhanced.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A power managing apparatus, having an enable pin used to couple a first level control circuit, the power managing apparatus comprising:
   a second level control circuit, coupled to the enable pin; and
   a level detecting circuit, coupled to the enable pin, for detecting a control signal on the enable pin, wherein the control signal is transmitted from the first level control circuit,
   wherein the control signal has at least three levels according to the operations of the first level control circuit and the second level control circuit, when the level detecting circuit detects that the control signal is at a first level or a second level, the level detecting circuit controls the power managing apparatus operated in a disable state.

2. The power managing apparatus of claim 1, wherein when the level detecting circuit detects that the control signal is at a third level, the level detecting circuit controls the power managing apparatus operated in an enable state.

3. The power managing apparatus of claim 1, wherein the first level control circuit comprises a first resistance unit and a first control switch, one terminal of the first resistance unit is coupled to a first operating voltage and the other terminal of the first resistance unit is coupled to the first control switch, the first control switch receives a system control signal and operates according to the system control signal.

4. The power managing apparatus of claim 1, wherein the second level control circuit comprises a second resistance unit and a second control switch, one terminal of the second resistance unit is coupled to the enable pin and the level detecting circuit, the other terminal of the second resistance unit is coupled to the second control switch.

5. The power managing apparatus of claim 1, wherein the second level control circuit comprises a current source coupled to the enable pin and the level detecting circuit.

6. The power managing apparatus of claim 1, wherein the first level control circuit comprises a first resistance unit and a first control switch, the second level control circuit comprises a second resistance unit and a second control switch, the first control switch and the second control switch are controlled to make the first resistance unit and the second resistance unit to form a voltage divider network.

7. A DC-DC control circuit, comprising:
   a first level control circuit, for providing a control signal;
   a power controller, having a first enable pin and comprising a second level control circuit, wherein the power controller is coupled to the first level control circuit through the first enable pin; and
   a driver, having a second enable pin coupled to the first level control circuit and the first enable pin,
   wherein the control signal has at least three levels according to the operations of the first level control circuit and the second level control circuit, and the power controller and the driver are enabled or disabled according to the at least three levels of the control signal.

8. The DC-DC control circuit of claim 7, wherein the power controller further comprises a level detecting circuit, the level detecting circuit is coupled to the first enable pin and used to detect the control signal on the first enable pin.

9. The DC-DC control circuit of claim 8, wherein when the level detecting circuit detects that the control signal is at a first level, the level detecting circuit controls the power controller operated in a disable state.

10. The DC-DC control circuit of claim 9, wherein when the level detecting circuit detects that the control signal is at a second level or a third level, the level detecting circuit controls the power controller operated in an enable state.

11. The DC-DC control circuit of claim 8, wherein when the level detecting circuit detects that the control signal is at a first level or a second level, the level detecting circuit controls the driver operated in a disable state.

12. The DC-DC control circuit of claim 11, wherein when the level detecting circuit detects that the control signal is at a third level, the level detecting circuit controls the driver operated in an enable state.

13. The DC-DC control circuit of claim 8, wherein the second level control circuit comprises a second resistance unit and a second control switch, one terminal of the second resistance unit is coupled to the first enable pin and the level detecting circuit, the other terminal of the second resistance unit is coupled to the second control switch.

14. The DC-DC control circuit of claim 8, wherein the second level control circuit comprises a current source coupled to the first enable pin and the level detecting circuit.

15. The DC-DC control circuit of claim 7, wherein the first level control circuit comprises a first resistance unit and a first control switch, one terminal of the first resistance unit is coupled to a first operating voltage and the other terminal of the first resistance unit is coupled to the first control switch, the first control switch receives a system control signal and operates according to the system control signal.

16. The DC-DC control circuit of claim 7, wherein the first level control circuit comprises a first resistance unit and a first control switch, the second level control circuit comprises a second resistance unit and a second control switch, the first control switch and the second control switch are controlled to make the first resistance unit and the second resistance unit to form a voltage divider network.

17. A method for enabling a chip, applied to a DC-DC control circuit, the DC-DC control circuit comprising a first level control circuit, a power controller, and a driver, the power controller having a first enable pin and comprising a second level control circuit, the first enable pin being coupled to the first level control circuit, the driver having a second enable pin coupled to the first level control circuit and the first enable pin, the method comprising steps of:

controlling operations of the first level control circuit and the second level control circuit to make the first level control circuit to provide a control signal having at least three levels; and enabling or disabling the power controller and the driver according to the at least three levels of the control signal.

18. The method of claim 17, further comprising step of: detecting the control signal on the first enable pin.

19. The method of claim 18, wherein if it is detected that the control signal is at a first level, the method further comprises step of:

controlling the power controller operated in a disable state.

20. The method of claim 19, wherein if it is detected that the control signal is at a second level or a third level, the method further comprises step of:

controlling the power controller operated in an enable state.

21. The method of claim 18, wherein if it is detected that the control signal is at a first level or a second level, the method further comprises step of:

controlling the driver operated in a disable state.

22. The method of claim 18, wherein if it is detected that the control signal it at a third level, the method further comprises step of:

controlling the driver operated in an enable state.

* * * * *